United States Patent [19]

Hara et al.

[11] Patent Number: 4,582,032

[45] Date of Patent: Apr. 15, 1986

[54] IGNITION TIMING CONTROL SYSTEM FOR INTERNAL COMBUSTION ENGINE

[75] Inventors: Youichi Hara, Hiratsuka; Haruya Shirose, Kawasaki, both of Japan

[73] Assignee: Nissan Motor Company, Limited, Yokohama, Japan

[21] Appl. No.: 657,818

[22] Filed: Oct. 5, 1984

[30] Foreign Application Priority Data

Dec. 22, 1983 [JP] Japan .................................. 58-242651

[51] Int. Cl.⁴ .............................................. F02M 3/07
[52] U.S. Cl. ..................................... 123/339; 123/418
[58] Field of Search ........................ 123/339, 418, 416

[56] References Cited

U.S. PATENT DOCUMENTS

| 4,328,775 | 5/1982 | Ironside | 123/339 |
| 4,344,397 | 8/1982 | Geiger et al. | 123/339 |
| 4,389,989 | 6/1983 | Hartig | 123/339 |
| 4,399,789 | 8/1983 | Yano | 123/339 X |

FOREIGN PATENT DOCUMENTS 57-83665 5/1982 Japan.

Primary Examiner—Tony M. Argenbright
Attorney, Agent, or Firm—Schwartz, Jeffery, Schwaab, Mack, Blumenthal & Evans

[57] ABSTRACT

When vehicle accessories such as air conditioning apparatus, power steering apparatus, etc. are turned on during engine idling, the ignition timing is corrected in such a way that an idle-operation advance angle table is switched to the usual-operation advance angle table or the idle-operation advance angle is reduced by a predetermined value or according to the magnitude of accessory loads under consideration of engine speed. Therefore, it is possible to prevent the setting of an excessive spark advance angle caused when the accessories are turned on during engine idling, thus preventing engine stop and engine power drop and improving fuel consumption rate during engine idling.

10 Claims, 13 Drawing Figures

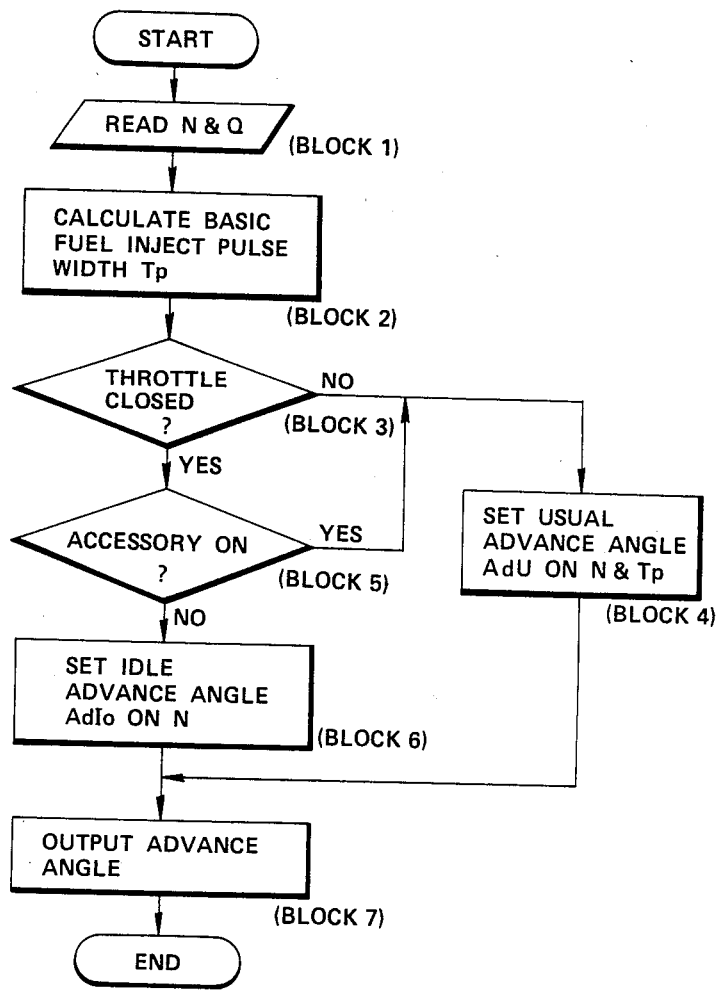

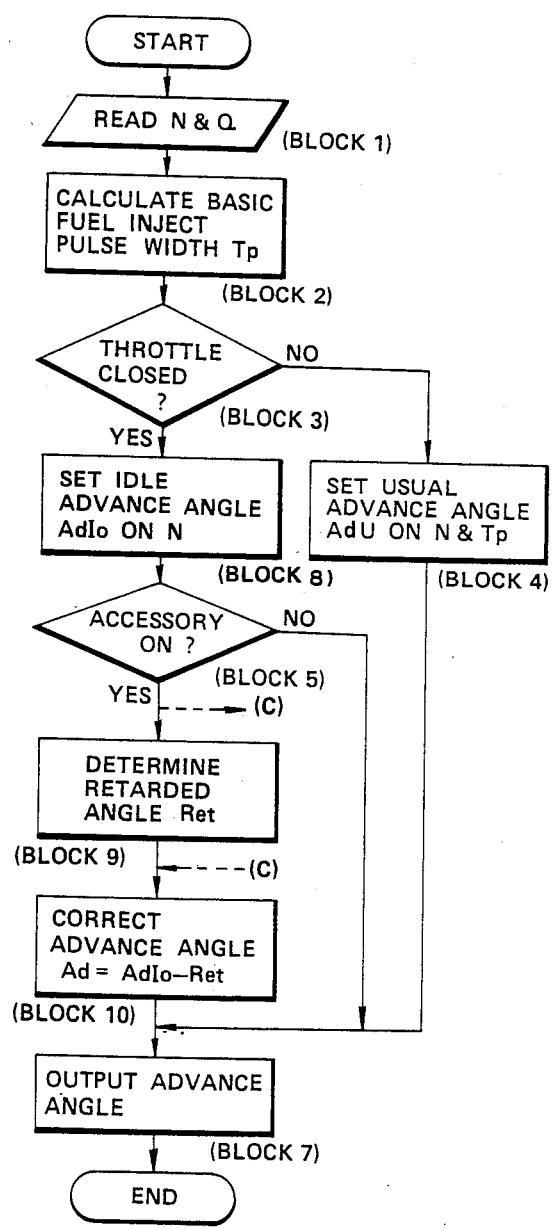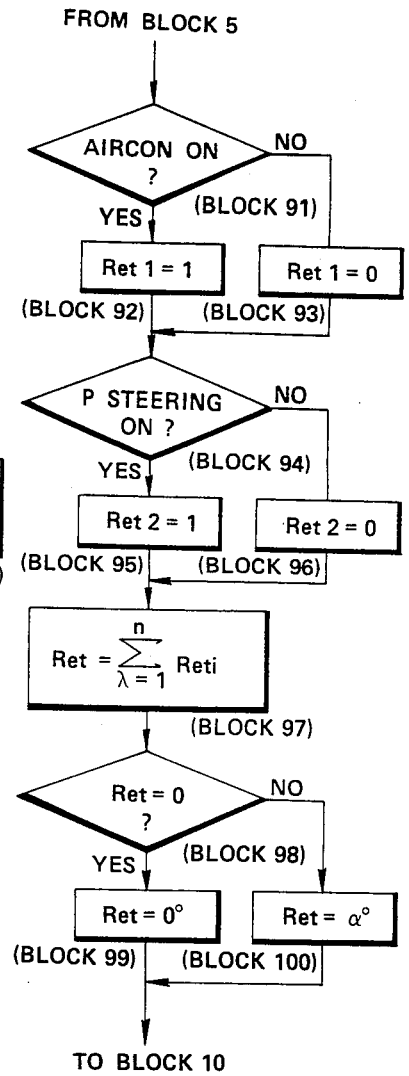

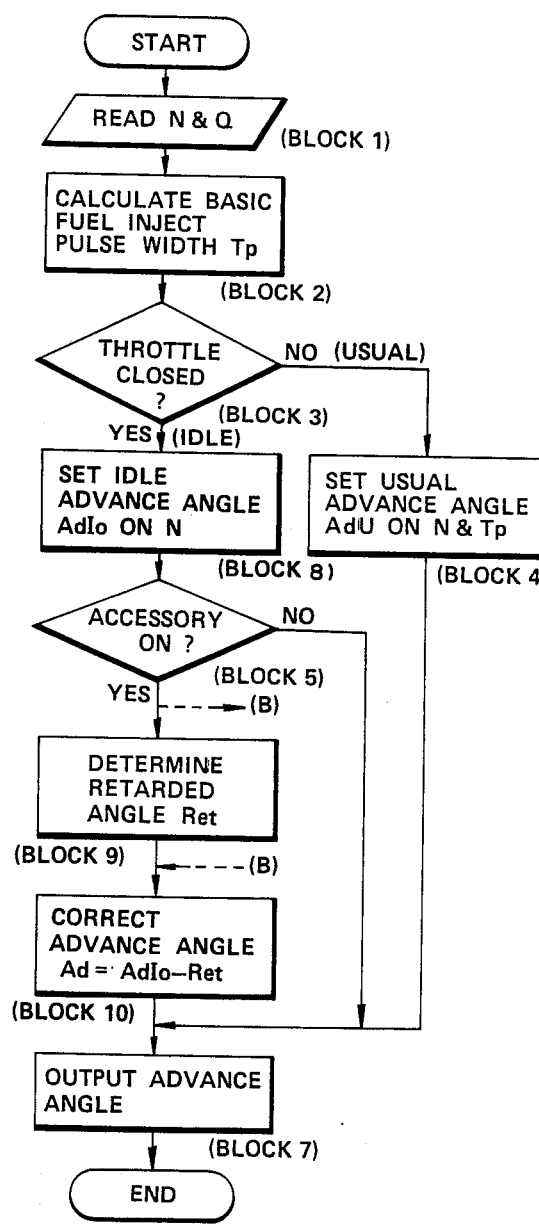
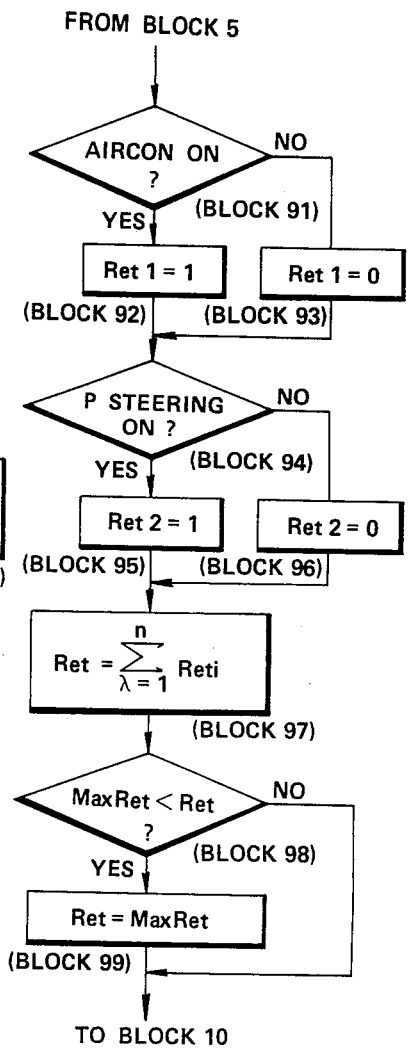
FIG.9 (A)
FIG.9 (B)

IGNITION TIMING CONTROL SYSTEM FOR INTERNAL COMBUSTION ENGINE

BACKGROUND OF THE INVENTION

1. Field of the Invention

The present invention relates generally to an ignition timing control system for an internal combustion engine and more specifically to a spark advance angle control system for an internal combustion engine by which spark advance angle is adjusted to an appropriate value especially when one or more vehicle accessories (air conditioning apparatus, power steering apparatus, etc.) are operated during engine idling.

2. Description of the Prior Art

Engine performance undergoes influences of mixture air-to-fuel ratio, the amount of intake air, compression pressure, combustion conditions of compressed mixture, etc. The combustion condition undergoes a serious influence of ignition timing. The ignition timing is usually represented by an advance angle of an engine crank angle. When an engine is being idled, the spark advance angle is determined between 5 to 30 degrees prior to the upper dead center. The spark advance angle results from a time delay caused by an ignition delay (from when a spark plug is ignited to when mixture begins to burn) and an explosion delay (from when mixture begins to burn to when a maximum explosion is obtained). Therefore, the spark advance angle is determined so that the combustion pressure reaches its maximum value when the piston is near the upper dead center. However, since the ignition timing or the spark advance angle changes according to engine speed and engine load, conventionally, a centrifugal automatic spark advance angle control device (governor controller) and a vaccum automatic spark advance angle control device (vacuum controller) are provided for an internal combustion engine.

Recently, microcomputer ignition timing control systems have been proposed for obtaining appropriate spark advance angle characteristics according to various engine operating conditions, in which spark advance angles are calculated in accordance with appropriate software. An example of these systems is disclosed in Japan Published Unexamined Patent Application No. 57-83665, entitled Method of controlling Engine Speed.

By the way, in these ignition timing control systems including a microcomputer, ignition spark advance characteristics are controlled separately when an engine is being idled without load and when the engine is operated under some load. Engine idling condition is detected by a throttle switch closed when the throttle value is fully or almost fully closed. In engine idle-operation condition, the ignition spark advance angle is controlled according to only engine speed. In engine usual-operation condition (except idle operation) ignition spark advance angle is controlled according to both engine speed and engine load.

In engine idle operation, since the mixture is ignited under relatively worse conditions, there exists a tendency that ignition timing is greatly advanced from the upper dead center as conpared with when the engine is operated under some load. Further, when engine speed drops in idle operation, the spark advance angle is further increased (advanced) according to the magnitude of drop in engine speed so as to compensate for drop of engine speed. In this case, when engine speed rises, the advance angle is decreased (retarded) or fixed at a constant value without correction.

In the prior-art ignition timing control system, as described above, in which spark advance angles are controlled separately when an engine is being idled and when the engine is operated under some load, when some vehicle accessories such as an air conditioning apparatus (compressor) and a power steering apparatus (pump) are driven by the engine and therefore engine speed drops temporarily in engine idle-operation condition, the ignition timing is further corrected in the direction that spark advance angle is further increased or advanced.

Under such a condition as when vehicle accessories are driven by the engine during engine idling, in reality, the engine is operating under some load and therefore the spark advance angle should be decreased or retarded from a value determined when the engine is being idled without any load.

In other words, the prior-art ignition timing control system has shortcomings such that when vehicle accessories are operated during engine idling, the ignition timing is excessively advanced, resulting in an increase in fuel consumption rate or a decrease in engine power or an engine stop.

Further, if the spark advance angle determined when the engine is being idled without load is kept unchanged when the accessories have been connected to the engine, since the advance angle is excessive because of application of accessory load, it is impossible to overcome the above-mentioned shortcomings.

SUMMARY OF THE INVENTION

With these problems in mind, therefore, it is the primary object of the present to provide an ignition timing control system for an internal combustion engine by which spark advance angle is decreased or detarded to an appropriate value, when accessories are turned on and therefore accessory load is applied to the engine during idling, in order to improve fuel consumption rate and engine power and simultaneously to prevent accessory maloperation or engine stop caused by lack of engine power.

To achieve the above-mentioned object, the ignition timing control system for an internal combustion engine according to the present invention comprises (a) engine speed sensor means for outputting an engine speed signal, (b) engine load sensor means for outputting an engine load signal, (c) engine idling sensor means for detecting that the engine is being idled and outputting an engine idle signal, (d) accessory-on sensor means for detecting that at least one accessory is being driven by the engine, and (e) ignition timing determining means for determining an appropriate usual-operation ignition timing in response to the detected engine speed signal and the detected engine load signal and in accordance with table look-up method to a usual-operation advance angle table when said engine idling sensor means outputs no engine idle signal, an appropriate idle-operation ignition timing in response to the detected engine speed signal and in accordance with table look-up method to an idle-operation advance angle table when said engine idling sensor means outputs an engine idle signal, and an appropriate idle-operation ignition timing in response to the detected engine speed signal and the detected engine load signal and in accordance with table look-up method to a usual-operation advance angle table when said engine idle sensor means outputs an engine idle signal and further when said accessory-on sensor means outputs at least one accessory-on signal.

Further, in another modification, the ignition timing control system according to the present invention further comprises an ignition timing correcting means for correcting the appropriate idle-operation advance angle determined by said ignition timing determining means by retarding a predetermined value from the determined value when said engine idle sensor means outputs an engine idle signal and further when said accessory-on sensor means outputs at least one accessory-on signal.

To achieve the above-mentioned object, the method of controlling ignition timing for an internal combustion engine according to the present invention comprises the following steps of (a) detecting engine speed N, (b) detecting an amount Q of intake air, (c) calculates a basic amount $T_p$ of fuel to be supplied to the engine, (d) checking whether or not a throttle valve is almost fully closed, (e) if the throttle valve is not almost fully closed, setting a usual-operation advance angle AdU in accordance with table look up method on the basis of the detected engine speed, the calculated basic fuel amount and a usual-operation advance angle table, (f) if the throttle valve is almost fully closed, checking whether or not at least one accessory is driven by the engine, (g) if at least one accessory is driven by the engine, setting a usual-operation advance angle AdU in the same manner as in step (e) above, (h) if no accessory is driven by the engine, setting an idle-operation advance angle AdIo in accordance with table look up method on the basis of the detected engine speed and an idle-operation advance angle table, and (i) outputting the set advance angle AdU or AdIo, respectively.

Further, in another modification, the method of controlling ignition timing according to the present invention further comprises the steps of (a) if at least one accessory is driven by the engine, determining a value Ret to be retarded, and (b) correcting the set idle-operation advance angle AdIo by subtracting the determined value Ret from the set advance angle AdIo.

BRIEF DESCRIPTION OF THE DRAWINGS

The features and advantages of the ignition timing control system for an internal combustion engine according to the present invention over the prior-art system will be more clearly appreciated from the following description of the preferred embodiments of the invention taken in conjunction with the accompanying drawings in which like reference numerals designate the same or similar elements or sections throughout the figures thereof and in which:

FIG. 4(A) is a control flowchart showing the steps of controlling ignition timing in a first modification of the first embodiment of the ignition timing control system according to the present invention;

FIG. 4(B) is a control flowchart showing the steps of controlling ignition timing in a second modification of the first embodiment of the ignition timing control system according to the present invention;

FIG. 4(C) is a detailed control flowchart showing the step of setting a retarded advance angle value Ret shown in FIG. 4(B);

FIG. 9(A) is a control flowchart showing the steps of controlling ignition timing in the second embodiment of the ignition timing control system according to the present invention;

FIG. 9(B) is a detailed control flowchart showing the step of setting a retarded advance angle value Ret shown in FIG. 9(a)

DETAILED DESCRIPTION OF THE PREFERRED EMBODIMENTS

Figure 1:
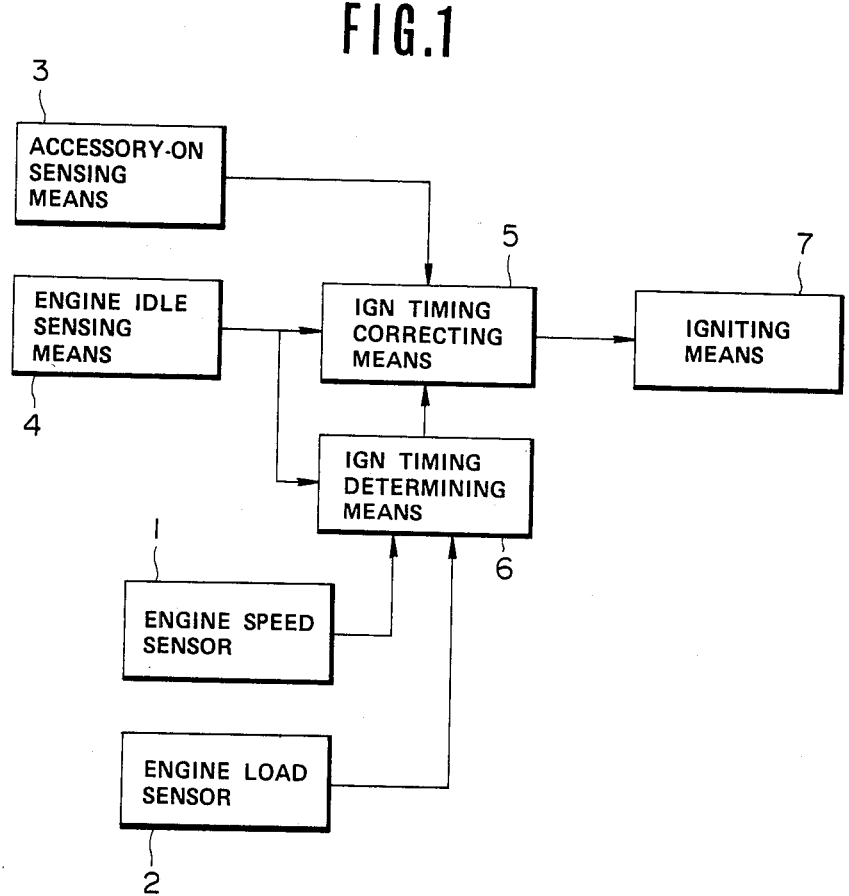
FIG. 1 is a schematic block diagram showing the basic system configuration of a first embodiment of the ignition timing control system for an internal combustion engine according to the present invention.

With reference to FIG. 1, a basic system configuration of the first embodiment of the ignition timing control system according to the present invention will be described hereinbelow. The system comprises an engine speed sensor 1, an engine load sensor 2, an accessory-on sensing means 3, an engine idle sensing means 4, an ignition timing correcting means 5, and ignition timing determining means 6, and an igniting means 1.

When an engine is being operated under some load, that is, when an engine is not operated in idle condition, the ignition timing determining means 6 determines an appropriate ignition timing (an usual-operation advance angle AdU) on the basis of an engine speed detected by the engine speed sensor 1 and an engine load detected by the engine load sensor 2 and in accordance with table look-up method. The determined advance angle value is applied to the igniting means 7 through the ignition timing correcting means 5 in which no correcting operation is made.

On the other hand, when the engine is being idled, the ignition timing determining means 6 determines an appropriate ignition timing (an idle-operation advance angle AdIo) on the basis of an engine speed detected by engine speed sensor 1 and in accordance with table look-up method. The determined advance angle value is applied to the igniting means 7 through the ignition timing correcting means 5 in which no correcting operation is made.

However, it some vehicle accessories (e.g. a compressor for an air-conditioning apparatus or a hydraulic pump for a power steering apparatus) is turned on and therefore driven by the engine while engine is being idled, the ignition timing correcting means 5 corrects the idle-operation advance angle value AdIo to a smaller value (a retarded advance angle) in response to an accessory-on signal detected by the accessory-on sensing means 3. This is because when accessories are turned on, engine load increases, as compared with when the engine is being idled without load, and therefore the advance angle should be retarded. The corrected advance angle value is directly applied to the igniting means 7 from the ignition timing correcting means 5.

Figure 2:
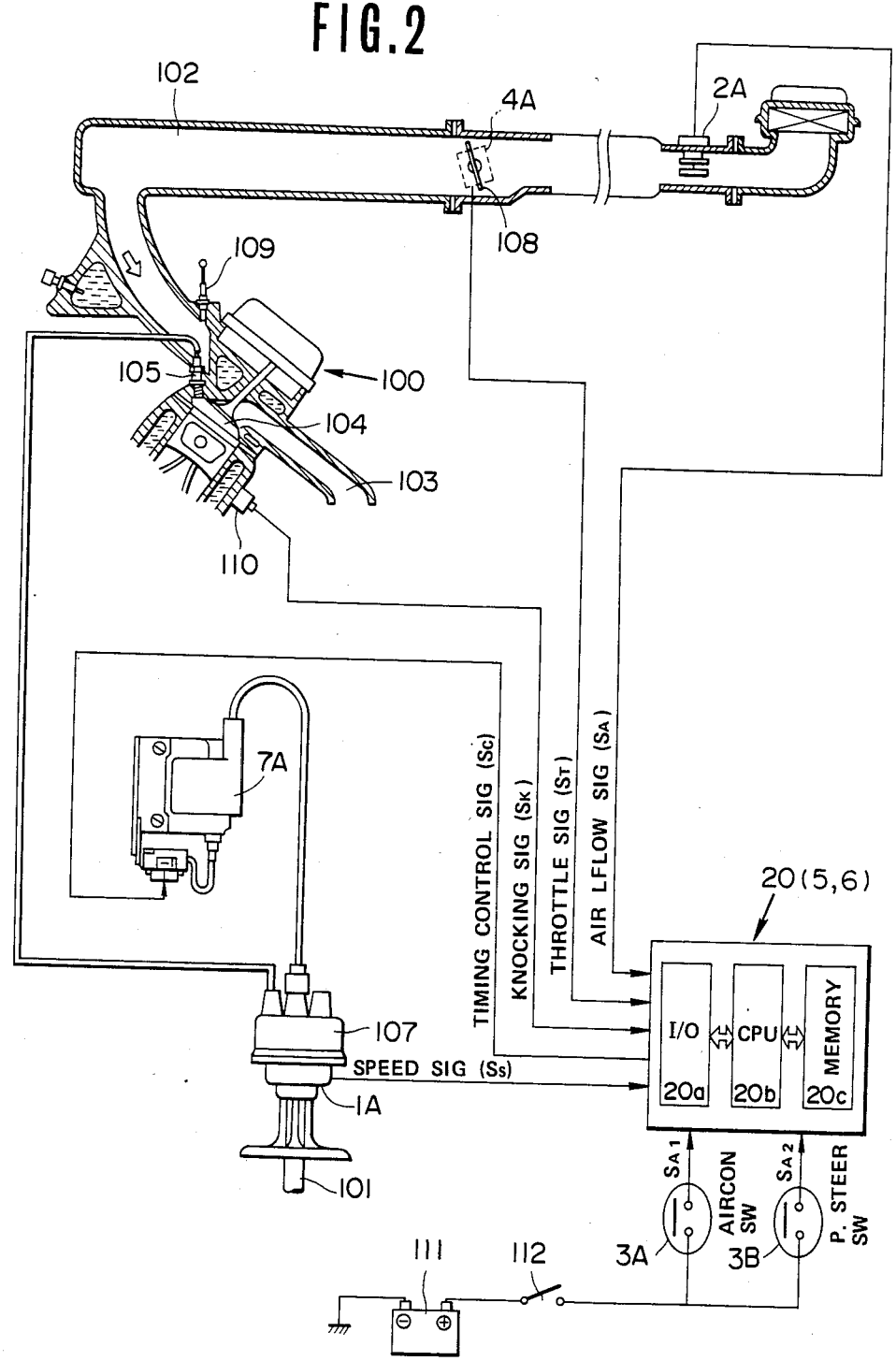
FIG. 2 is a diagrammatical illustration including a schematic block diagram showing the first embodiment of the ignition timing control system according to the present invention.

With reference to FIG. 2, the first embodiment of the ignition timing control system according to the present invention will be described in more detail hereinbelow.

In the drawing, to an internal combustion engine 100, an intake passage 102 and an exhaust passage 103 are connected. In an engine combustion chamber 104, an ignition plug 105 is provided. A high igniting voltage is applied from an ignition coil 7A (igniting means 7) to this ignition plug 105 through a distributor 107 connected to an engine crank shaft 101. Within the intake passage 102, an air flow meter 2A and a throttle valve opening-rate sensor 4A are disposed. The air flow meter 2A detects the amount of intake air flowing through the intake passage 102 into the engine combustion chamber 104. This air flow meter 2A corresponds to the engine load sensor 2, because the heavier the engine load, the greater the amount of intake air introduced into the engine 100. The throttle valve opening-rate sensor 4A detects the opening rate of a throttle value 108 disposed within a carburetor. This throttle valve sensor 4A corresponds to the engine idle sensing means 4, because when the engine is being idled, the throttle valve 103 is almost fully closed and therefore the opening-rate is nearly zero. A crank angle sensor 1A is disposed at an engine crank shaft 101 of the engine for detecting the number of engine revolutions per unit time, together with the distributor 107.

Additionally, an air conditioning apparatus switch 3A (a first accessory-on sensing means 3) and a power steering apparatus switch 3B (a second accessory-on sensing means 3) are connected to a battery 111 through a main switch 112. The switch 3A is turned on when an air compressor of the air conditioning apparatus provided for an vehicle is driven by the engine; the switch 3B is turned on when an hydraulic pump of the power steering apparatus also provided for the vehicle is driven by the engine. Both the switches 3A and 3B detect an additional engine load applied to the engine during idling. Furthermore, an engine knocking sensor 110 is attached to the engine cylinder block for detecting the presence of engine knocking. Although being not directly related to the elements of the present invention, this knocking sensor is closely related to spark advance angles. The reference numeral 109 denotes a fuel injection value through which an appropriate amount of fuel according to engine speed and load is injected into the combustion chamber 104 of the engine.

The reference numeral 20 denotes a control unit 20 which corresponds to the ignition timing determinating means 6 and the ignition timing correcting means 5. This control unit 20 determines an appropriate spark advance angle according to engine operating conditions, that is, in response to various sensor signals and outputs an ignition timing control signal ($S_C$) to the ignition coil 7A. These sensor signals are an air flow meter signal ($S_A$), a throttle signal ($S_T$), an engine knocking signal ($S_K$), an engine crank angle signal ($S_{CA}$), and accessory signals ($S_{A1}$, $S_{A2}$). The control unit 20 (5, 6) is a microcomputer including an input/output interface 20a, a central processing unit 20b, and a memory unit 20c (read-only memory and random-access memory). The CPU 20b executes various calculations or operations to determine an appropriate spark advance angle in response to various sensor signals inputted through the I/O interface 20a in accordance with control software stored in the ROM 20c and outputs an ignition timing control signal ($S_C$) to the ignition coil 7A through the I/O interface 20a.

Figure 3:
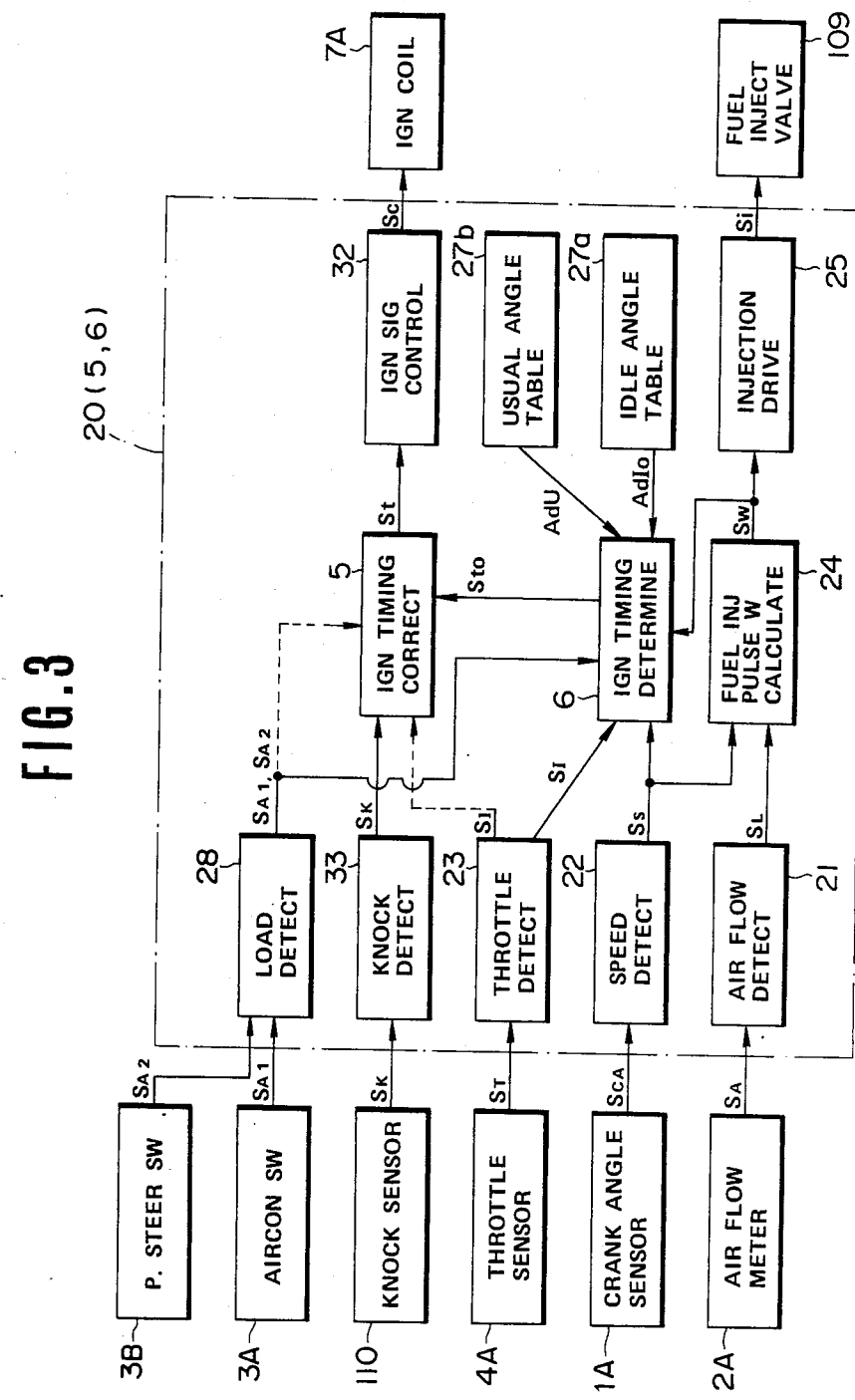
FIG. 3 is a schematic block diagram showing a detailed control unit configuration used with the first embodiment of the ignition timing control system according to the present invention.

With reference to FIG. 3, the functions of the control unit 20 will be described hereinbelow in more detail. The input port of the I/O interface 20a includes such functions as an intake air flow amount detecting means 21, an engine speed detecting means 22, a throttle valve opening-rate detecting means 23, an engine knocking detecting means 33 and an accessory-on detecting means 28.

The intake air flow amount detecting means 21 receives and amplifies an output signal ($S_A$) from the air flow meter 2A, converts the signal from analog to digital, where necessary, and output a signal ($S_L$) representative of engine load. The engine speed detecting means 22 receives and processes an output signal ($S_{CA}$) from the crank angle sensor 1A and outputs a signal ($S_S$) representative of engine speed. The throttle valve opening-rate detecting means 23 receives an output signal ($S_T$) from the throttle valve open-rate sensor 4A and outputs a signal ($S_I$) representative of engine idle-operation when the throttle valve sensor 4A detects that the valve is almost fully closed. The engine knocking detecting means 33 receives an output signal ($S_K$) from the knocking sensor 110, determines the presence or absence of engine knocking and outputs a signal ($S_K$) indicative of the presence of engine knocking. The accessory-on detecting means 28 receives two output signals ($S_{A1}$, $S_{A2}$) from the air conditioning apparatus switch 3A and the power steering apparatus switch 3B separately and outputs signals ($S_{A1}$, $S_{A2}$) indicative of accessory operation, independently, when the respective switch is turned on.

The memory unit 20c stores an idle-operation advance angle table 27a to be selected when the throttle valve opening-rate detecting means 23 outputs an engine idle signal ($S_I$) and a usual-operation advance angle table 27b to be selected when the throttle valve opening-rate detecting means 23 does not output an engine idle signal ($S_I$). In the idle-operation advance angle table 27a, the appropriate spark advance angles in engine idling are allocated under consideration of engine speed, that is, with engine speed as parameter. In the usual-operation advance angle table 27b, the appropriate spark advance angles in usual engine operation (except idling) are allocated under consideration of engine speed and engine load (fuel injection pulse width), that is, with engine speed and engine loads as parameters.

Figure 5:
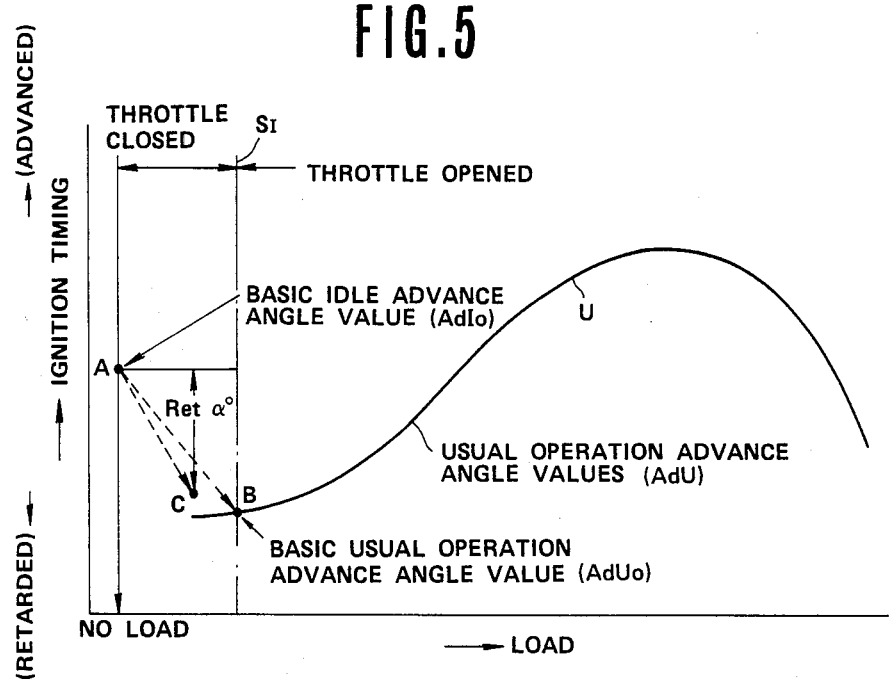
FIG. 5 is an exemplary graphical representation showing the relationship between ignition timing (advance angle) and engine load in the first and second modifications of the first embodiment of the ignition timing control system according to the present invention, in which a basic idle advance angle AdIo is switched to the basic usual-operation advance angle values AdUo or to a fixed value, irrespective of the magnitude of accessory load.
Figure 6:
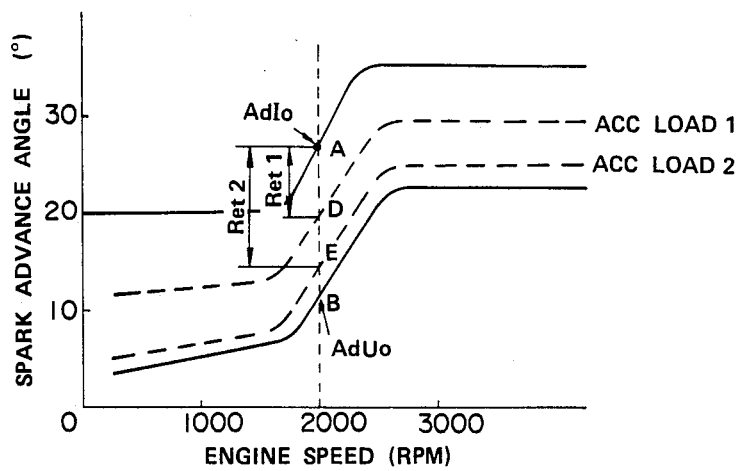
FIG. 6 is an exemplary graphical representation showing the relationship between advance angle and engine speed with engine load as parameter.

Examples of these two tables 27a and 27b are shown in FIGS. 5 and 6 in the form of graphical representation. In FIG. 5, the engine idle-operation range without load is indicated on the lefthand side from the dot and dashed line $S_I$ and the engine usual-operation range under some load is indicated on the righthand side fron the dot and dashed line $S_I$. The basic idle advance angle value AdIo is shown by point A when engine speed is constant (e.g. 2000 rpm); however, the basic usual-operation advance angle values AdU changes along the curve U according to the engine load when engine speed is constant (e.g. 2000 rpm). In the curve U, advance angles increases gradually to its maximum value beginning from a basic usual-operation advance angle value (AdUo) shown by point B and decreases gradually from its maximum value with increasing engine load.

In the first modification of the first embodiment, the basic idle advance angle value AdIo shown by point A is set to the basic usual-operation advance angle value AdUo shown by point B when some accessory is turned on during engine idling and thereafter the advance angle is adjusted along the curve U according to the accessory load. However, here it should be noted that since AdUo is fairly retarded from AdIo, the advance angle determined along the curve U when some accessory is turned on during engine idling is also appropriately retarded from AdIo, being different from the prior-art ignition control system.

In contrast with this, in the second modificaton of the first embodiment, the basic idle-operation advance angle value AdIo is reduced by a predetermined value (Ret=$\alpha°$ e.g. 15°) to a point C when some accessory is turned on during engine idling.

FIG. 6 indicates that the basic idle-operation advance angle value AdIo and the basic usual-operation advance angle value AdUo both determined when engine speed is constant (e.g. 2000 rpm) change according to engine speed. In this drawing, the advance angles are fairly retarded when engine speed is less than 1800 rpm. This is because it is possible to stably operate the engine at low engine speed during both engine idle-operation and engine usual-operation. However, without being limited to these characteristics, it is possible to appropriately determine other ignition timings or advance angles according to various engine operating conditions or accessory load conditions.

With reference to FIG. 3 again, the central processing unit 20b includes such functions as a fuel injection pulse width calculating means 24, an ignition timing determining means 6, and an ignition timing correcting means 5. The fuel injection pulse width calculating means 24 calculates an appropriate amount of fuel to be injected to the engine 100 on the basis of an engine speed signal ($S_S$) and an engine load signal ($S_L$) and outputs a signal ($S_W$) with a variable pulse width indicative of the amount of fuel injection. This signal also represents an engine load. The ingition timing determining means 6 determines an appropriate ignition timing or spark advance angle on the basis of the detected engine speed ($S_S$) and engine load ($S_W$) in accordance with table look-up method. That is to say, when engine is being idled, appropriate advance angles are selected from the idle-operation advance angle table 27a; when engine is being operated under some load, appropriate advance angles are selected from the usual-operation advance angle table 27b.

Further, in the first modification of the first embodiment, the ignition timing determining mean 6 selects appropriate idle-operation advance angles AdIo from the idle-operation advance angle table 27a when the engine is being idled but from the usual-operation advance angle table 27b in response to the accessory-on signal ($S_{A1}$, $S_{A2}$) when one or both of the accessories are turned on during engine idling.

The ignition timing correcting means 5 corrects appropriate advance angles determined by the ignition timing determining means 6 when a knocking presence signal ($S_K$) is outputted thereto from the engine knocking detecting means 33 in the direction that the advance angles are retarded.

Further, in the second modification of the first embodiment, this ignition timing correcting means 5 corrects the appropriate idle-operation advance angle determined by the ignition timing determined means 6 in such a way that a predetermined value is subtracted from the determined advance angle in response to the idle signal ($S_I$) from the throttle valve opening-rate detecting means 23 and to the accessory-on signal $S_{A1}$ or $S_{A2}$ from the accessory-on detecting means 28, that is, when one or both accessories are turned on during engine idling, the connection between elements related to the above description being shown by dashed lines in FIG. 3.

The output port of the I/O interface 20a includes such functions as an injection signal driving means 25 and an ignition timing control means. The ignition signal drivng means 25 receives and amplifies an output signal ($S_W$) from the fuel injection pulse width calcuating means 24 and outputs a signal (Si) to the fuel injection value 109. The ignition timing control means 32 receives and processes an output signal (St) from the ignition timing correcting means 5 and outputs a signal (Sc), the delay time of which is appropriately controlled from a reference time so as to advance or retart the ignition timing, to the ignition coil 7A.

With reference to a control flowchart shown in FIG. 4(A), the operation of the first modification of the first embodiment of the ignition timing control system according to the present invention will be described thereinbelow, in which the idle-operation advance angle value AdIo is switched to an appropriate value on and along the usual-operation advance angle curve U when one or both of the accessories are turned on during engine idling.

The operation routine shown in FIG. 4(A) is repeated for each engine ignition. In FIG. 4(A), control program first reads a crank angle sensor signal $S_{CA}$ to obtain an engine speed N and an air flow meter signal $S_A$ to obtain the amount Q of intake air (in block 1), and then calculates a basic fuel injection pulse width $T_p$ for obtaining an appropriate mixture on the basis of the read engine speed N and the amount Q of intake air (in block 2). Control determines whether or not the throttle valve is almost fully closed on the basis of the throttle opening-rate sensor signal $S_T$. If not closed, that is, NO, since this indicates that the engine is operating in usual operation under some load, control advances to the succeeding step to select the usual-operation advance angle table 27b and set an appropriate usual-operation advance angle value AdU from the selected table 27b under consideration of engine speed N and engine load (fuel injection pulse width $T_p$). The set advance angle value AdU is stored in a memory unit temporarily (in block 4). If closed, that is, YES (in block 3), since this indicates that the engine is being idled, control advances to the succeeding step and determines whether or not some accessories are turned on the basis of the air conditioning apparatus switch signal $S_{A1}$ and/or the power steering apparatus switch $S_{A2}$ (in block 5). If turned on, that is, YES, since this indicates that engine is being idled under some load, control returns to block 4 to set an appropriate advance angle value AdU from the usual-operation advance angle table 27b, under consideration of engine speed and accessory load. Here, it should be noted that since the accessory load is relatively light, the advance angle is fairly retarded as compared with the idle-operation advance angle value AdIo as depicted in FIG. 5. If not turned one (in block 5), that is, NO, since this indicates that engine is being idled without load, control advances to the succeeding step to select an idle-operation advance angle table 27a and set an appropriate advance angle value AdIo from the selected table 27a under consideration of engine speed N (in block 6). The set idle-operation advance angle AdIo or the set usual-operation advance angle AdU is outputted to the ignition coil, respectively (in block 7).

With reference to control flowcharts shown in FIGS. 4(B) and 4(C), the operation of the second modification of the first embodiment of the ignition timing control system according to the present invention will be described thereinbelow, in which the idle-operation advance angle value AdIo is reduced by a predetermined value Ret=α° when one or both of the accessories are turned on during engine idling. In FIG. 4(B), if control determines that the throttle value is closed and therefore the engine is being idled (in block 3), control advances to the succeeding step to select an idle-operation advance table 27a and set an appropriate idle-operation advance angle value AdIo from the selected table 27a under consideration of engine speed N (in block 8), which is similar to the block 6 shown in FIG. 4(A). Thereafter, control determines whether or not some accessories are turned on, on the basis of the air conditioning apparatus switch signal $S_{A1}$ and/or the power steering apparatus switch $S_{A2}$ (in block 5). If not turned on, that is, NO, since this indicates that the engine is being idled without load, control directly advance to block 7 to output an idle-operation advance angle value AdIo set previously in block 8 as it is. If turned on (in block 5), that is, YES, since this indicates that the engine is being idled under some load, control advances to the succeeding step to determine an angle value Ret to be deterded (in block 9). The determined angle to be retarded Ret is subtracted from the idle-operation advance angle value AdIo previously set in block 8 for obtaining a corrected idle-operation advance angle value (Ad=AdIo−Ret) (in block 10). The corrected value Ad is then outputted (in block 7).

The method of determining of an angle to be retarded when some accessory is turned on during engine idling (in block 9) will be explained in more detail with reference to FIG. 4(C).

If control determines that some accessory is turned on (in block 5), control first checks whether or not the air conditioning apparatus is turned on the basis of the air conditioning apparatus switch 3A (in block 91).

If on, the retarded value is set to (Ret 1=1) in block 92); if off, the retarded value is set to (Ret 1=0) (in block 93). Thereafter, control checks whether the power steering apparatus is turned on or not on the basis of the power steering apparatus switch 3B (in block 94). If on, the retarded value is set to (Ret 2=1) (in block 95); if off, the retarded value is set to (Ret 2=0) (in block 96). Thereafter, control obtains an addition of the retarded values $$\left( \text{Ret} = \sum_{\lambda=1}^{n} \text{Ret } i \right)$$

(in block 97) and then checks whether or not the added value to be retarded Ret is zero (in block 98). If Ret is zero, a retarded value of zero (Ret=0) is set (in block 99); if Ret is not zero, a retarded value of (Ret=α°) (α is a predetermined angle, e.g. 15 degrees) is set (in block 100). Thereafter, the determined value to be retarded 0° or α° is subtracted from the idle-operation advance angle AdIo for obtaining a corrected advance angle (AdU=AdIo−Ret) (in block 10).

Figure 7:
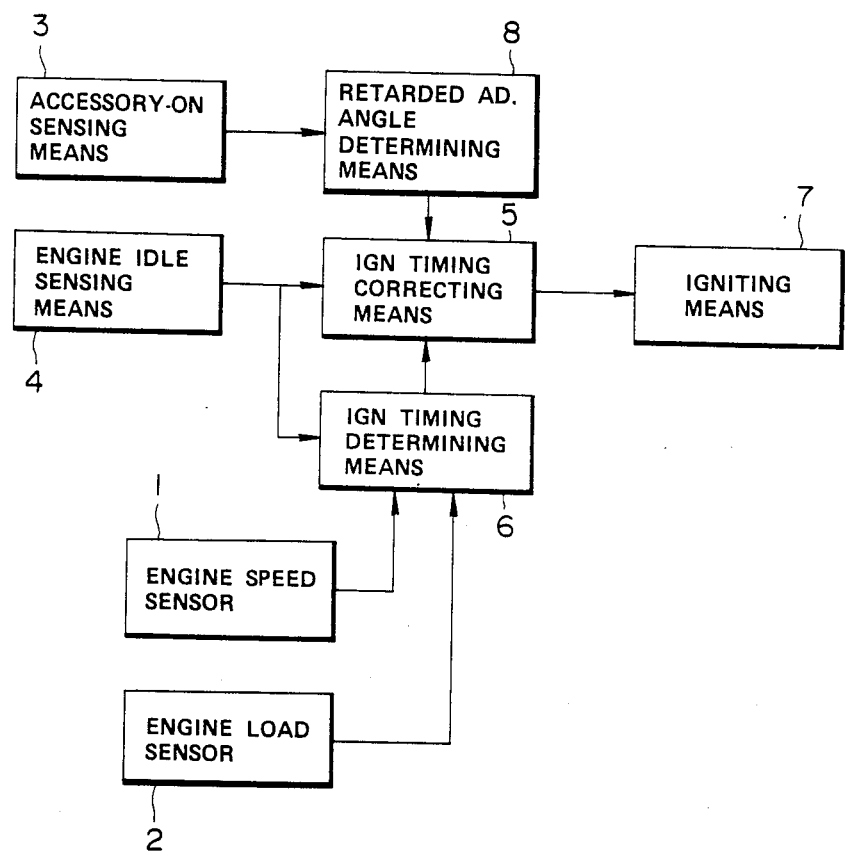
FIG. 7 is a schematic block diagram showing the basic system configuration of a second embodiment of the ignition timing control system for an internal combustion engine according to the present invention.

With reference to FIG. 7, the basic system configuration of the second embodiment of the ignition timing control system according to the present invention will be described hereinbelow.

In the drawing, the system further comprises a retarded advance angle determining means 8 in addition to the elements shown in FIG. 1. This determining means 8 determines an advance angle to be retarded during engine idling according to each accessory load. In the first embodiment shown in FIG. 1, the advance angle to be retarded is automatically changed to an usual-operation advance angle value AdUo shown by point B in FIG. 5 or to a fixed value (AdU=AdIo−Ret α°) shown by point C in FIG. 5. However, in the second embodiment, the advance angle to be retarded is finely determined according each magnitude of accessory loads. Therefore, it is more accurately determines the idle-operation advance angle when some accessories are turned on during engine idling.

Figure 8:
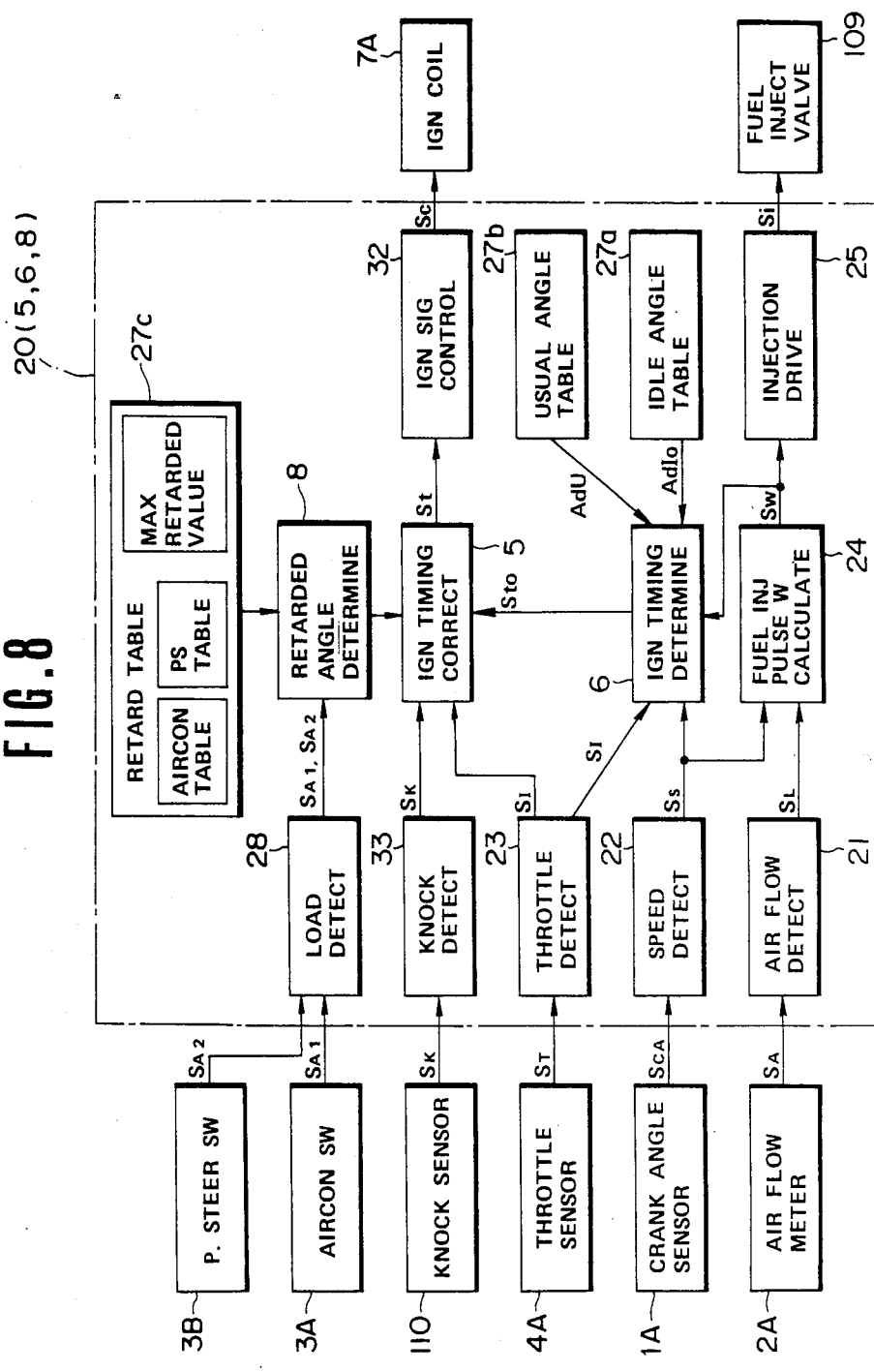
FIG. 8 is a schematic block diagram showing a detailed control unit configuration used with the second embodiment of the ignition timing control system according to the present invention.

With reference to FIG. 8, the functions of the control unit 20 different from the first embodiment shown in FIG. 3 will be described hereinbelow in more detail. The memory unit 20c additionally stores a retarded advance angle table 27c. This retarded advance angle table 27c includes an air conditioning table, a power steering table and a maximum retarded angle value table. The air conditioning table lists appropriate values to be retarded from the idle-operation advance angles AdIo under consideration of engine speed, that is, with engine speed as parameter when the air conditioning apparatus is turned on during engine idling. The power steering table lists appropriate values to be retarded from the idle-operation advance angles AdIo under consideration of engine speed, that is, with engine speed as parameter when the power steering apparatus is turned on during engine idling. Further, the maximum retarded angle table lists the maximum values retardable from the idle-operation advance angles AdIo under consideration of engine speed, that is, with engine speed as parameter, if the addition of values to be retarded when the air conditioning apparatus and the power steering apparatus ae both turned on simultaneously during engine idling exceeds these maximum values.

The central processing unit 20b further includes such functions as a retarded advance angle determining means 8. This determining means 8 determines an appropriate value to be detarded from the idle-operation advance angle AdIo in response to the air conditioning-on signal $S_{A1}$ and the power steering-on signal $S_{A2}$ and in accordance with the retarded advance angle table 27c.

The appropriate value Ret to be detarded which is determined by the retarded advance angle determining means 8 is transferred to the ignition timing correcting means 5. In this correcting means 5, the value Ret is subtracted from the idle-operation advance angle value AdIo determined by the ignition timing determining means 6 and the difference between the two (AdU=AdIo−Ret) is applied to the ignition coil 7A after being processed through the ignition signal control means 32. The ignition timing correcting means 5 corrects the idle-operation advance angle value AdIo in response to the idle signal (S$_j$) from the throttle valve opening-rate detecting means 223, but does not correct the AdIo when the idling signal (S$_j$) is not applied thereto from the detecting means 23. However, if the knocking sensor 110 detects the presence of engine knocking, this correcting means 5 corrects the advance angle in the direction that the angle is retarded according to the degree of engine knocking.

With reference to control flowcharts shown in FIGS. 9(A) and 9(B), the operation of the second embodiment of the ignition timing control system according to the present invention will be described thereinbelow, in which the idle-operation advance angle value AdIo is reduced one by one by appropriate values determined according to each accessory load. The description of the flowchart shown in FIG. 9(A) is quite the same as that of the flowchart shown in FIG. 4(B), therefore being omitted herein.

The method of determining of an angle to be retarded when accessories are turned on during engine idling (in block 9) shown in FIG. 9(A) will be explained in detail with reference to FIG. 9(B).

If control determines that some accessory is turned on (in block 5), control first checks whether the air conditioning apparatus is turned on or not on the basis of the air conditioning apparatus switch 3A (in block 91). If on, control reads a value Ret 1 to be retarded due to the air conditioning apparatus from the air conditioning table in the retarded advance angle table 27c under consideration of engine speed and stores the value Ret 1 in the memory unit (in block 92).

If off, the retarded value is set to (Ret 1=0) (in block 93). Thereafter, control checks whether the power steering apparatus is turned on or not on the basis of the power steering apparatus switch 3B (in block 94). If on, control reads a value Ret 2 to be retarded due to the power steering apparatus from the power steering table in the retarded advance angle table 27c under the consideration of engine speed and stores the value Ret 2 in the memory unit (in block 95). If off, the retarded value is set to (Ret 2=0) (in block 96). Thereafter, control obtains an addition of the retarded values $$\left( Ret = \sum_{\lambda=1}^{n} Ret\, i \right)$$

(in block 97) and then checks whether or not the added value Ret to be retarded exceeds a maximum value (Max Ret) selected from the maximum retarded angle value table in the retarded advance angle table 27c under consideration of engine load (in block 98). If Ret exceeds (Max Ret), the value Ret to be retarded is set to (Max Ret) (in block 99). If Ret does not exceed (Max Ret), the value Ret is set as it is. The determined value Ret to be detarded is subtracted from the idle-operation advance angle value AdIo previously set in block 8 for obtaining a corrected idle-operation advance angle value (Ad=AdIo−Ret) (in block 10). The corrected value Ad is then outputted in block 7 shown in FIG. 9(A).

Figure 10:
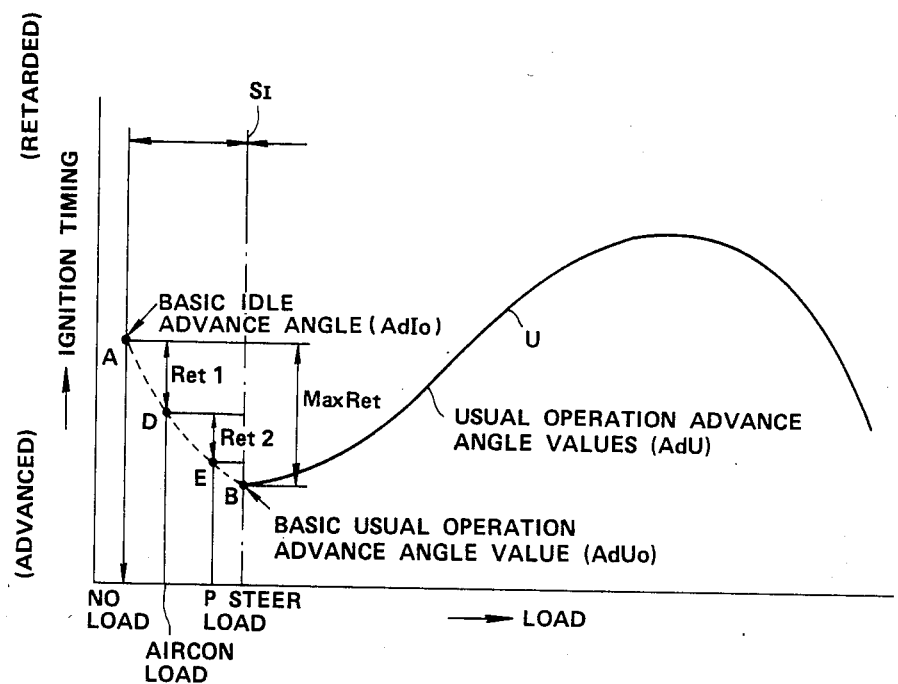
FIG. 10 is a graphical representation showing the relationship between ignition timing (advance angle) and engine load in the second embodiment of the ignition timing control system according to the present invention, in which a basic idle advance angle AdIo is retarded one step (Ret 1) by one step (Ret 2) when accessories are turned on one by one in engine idling.

FIG. 10 indicates an example of the advance angle values to be retarded when the accessories are turned on during engine idling. When no accessory is turned on, the basic idle-operation advance angle value AdIo at a constant engine speed shown by point A is determined under consideration of engine speed during engine idling. However, when the air conditioning apparatus is turned on during engine idling, a retarded value Ret 1 is selected from the table 27c and the advance angle is corrected to a value (Ad=AdIo−Ret 1) shown by point D. Additionally, when the power steering apparatus is turned on during engine idling, a retarded value Ret 2 is selected from the table 27c and the advance angle is further corrected to a value (Ad=AdIo−Ret 1−Ret 2) shown by point E. However, if the addition of two retarded values (Ret 1 and Ret 2) exceeds the maximum value (Max Ret), the advance angle is corrected to the basic usual-operation advance angle value AdUo shown by point B. FIG. 10 shows the case where the engine speed is constant (e.g. 2000 rpm). However, in FIG. 6, the corrected idle-operation advance angle value (Ad=AdIo−Ret 1) (point D) and the corrected value (Ad=AdIo−Ret 1−Ret 2) (point E) are represented under the consideration of engine speed by two dashed lines.

As described above, in the ignition timing control system according to the present invention, when accessory loads are applied to the engine during idling, the ignition timing is corrected in such a way that (1) the idle-operation advance angle table is switched to the usual-operation advance angle table, (2) the idle-operation advance angle is reduced by a predetermined value, or (3) the idle-operation advance angle is reduced according to the magnitude of each accessory load, it is possible to avert an excessive spark advance angle value caused when accessories are turned on during engine idling, so that it is possible to prevent engine stop and engine power drop and therefore to improve fuel consumption rate during engine idling.

It will be understood by those skilled in the art that the foregoing description is in terms of a preferred embodiment of the present invention wherein various changes and modifications may be made without departing from the spirit and scope of the invention, as set forth in the appended claims.

What is claimed is:

1. An ignition timing control system for an internal combustion engine, which comprises:
    (a) engine speed sensor means for outputting an engine speed signal;
    (b) engine load sensor means for outputting an engine load signal;
    (c) engine idling sensor means for detecting that the engine is being idled and outputting an engine idle signal;
    (d) accessory-on sensor means for detecting that at least one accessory is being driven by the engine and outputting at least one accessory-on signal; and
    (e) ignition timing determining means for determining an appropriate usual-operation ignition timing in response to the detected engine speed signal and the detected engine load signal and in accordance with table look-up method to a usual-operation advance angle table when said engine idling sensor means outputs no engine idle signal, an appropriate idle-operation ignition timing in response to the detected engine speed signal and in accordance with table look-up method to an idle-operation advance angle table when said engine idling sensor means outputs an engine idle signal, and an appropriate idle-operation ignition timing in response to the detected engine speed signal and the detected engine load signal and in accordance with table look-up method to a usual-operation advance angle table when said engine idle sensor means outputs an engine idle signal and further when said accessory-on sensor means outputs at least one accessory-on signal.

2. An ignition timing control system for an internal combustion engine, which comprises:
 (a) engine speed sensor means for outputting an engine speed signal;
 (b) engine load sensor means for outputting an engine load signal;
 (c) engine idling sensor means for detecting that the engine is being idled and outputting an engine idle signal;
 (d) accessory-on sensor means for detecting that at least one accessory is being driven by the engine and outputting at least one accessory-on signal; and
 (e) ignition timing determining means for determining an appropriate usual-operation ignition timing in response to the detected engine speed signal and the detected engine load signal and in accordance with table look-up method to a usual-operation advance angle table when said engine idling sensor means outputs no engine idle signal, and an appropriate idle-operation ignition timing in response to the detected engine speed signal and in accordance with table look-up method to an idle-operation advance angle table when said engine idling sensor means outputs an engine idle signal; and
 (f) ignition timing correcting means for correcting the appropriate idle-operation advance angle determined by said ignition timing determining means by retarding a predetermined value from the determined idle-operation advance angle when said engine idle sensor means outputs an engine idle signal and further when said accessory-on sensor means outputs at least one accessory-on signal.

3. The ignition timing control system as set forth in claim 2, which further comprises retarded advance angle determining means for determining at-least one value to be retarded from the appropriate idle-operation advance angle determined by said ignition timing determining means in response to an engine idle signal, according to magnitude of each accessory load, when said accessory-on sensor means outputs each accessory-on signal, each value to be retarded being applied to said ignition timing correcting means in place of the predetermined retarded value.

4. An ignition timing control system for an internal combustion engine, which comprises:
 (a) an engine crank shaft angle sensor for detecting engine speed and outputting an engine speed signal;
 (b) an intake air flow meter for detecting an amount of intake air flowing through an intake pipe and outputting an engine load signal corresponding thereto;
 (c) a throttle sensor for detecting a position at which a throttle value is almost fully closed and outputting an engine idle signal corresponding thereto;
 (d) an air conditioning apparatus switch for detecting that an air conditioning apparatus is driven by the engine and outputting an air-conditioner-on signal corresponding thereto;
 (e) a power steering apparatus switch for detecting that a power steering apparatus is driven by the engine and outputting a power-steering-on signal corresponding thereto; and
 (f) a microcomputer for storing a usual-operation advance angle table prepared with engine speed and engine load as parameters and an idle-operation advance angle table prepared with engine speed as parameter, said microcomputer determining an appropriate usual-operation advance angle in response to the detected engine speed signal and the detected engine load signal and in accordance with table look-up method to the stored usual-operation advance angle table when said throttle sensor outputs no engine idle signal, an appropriate idle-operation advance angle in response to the detected engine speed signal and in accordance with table look-up method to the stored idle-operation advance angle table when said throttle sensor outputs an engine idle signal, and an appropriate idle-operation advance angle in response to the detected engine speed signal and the detected engine load signal and in accordance with table look-up method to the stored usual-operation advance angle table when said throttle sensor outputs an engine idle signal and further when at least one of said air conditioning apparatus switch and said power steering apparatus switch outputs an respective apparatus-on signal.

5. An ignition timing control system for an internal combustion engine, which comprises:
 (a) an engine crank shaft angle sensor for detecting engine speed and outputting an engine speed signal;
 (b) an intake air flow meter for detecting an amount of intake air flowing through an intake pipe and outputting an engine load signal corresponding thereto;
 (c) a throttle sensor for detecting a position at which a throttle value is almost fully closed and outputting an engine idle signal corresponding thereto;
 (d) an air conditioning apparatus switch for detecting that an air conditioning apparatus is driven by the engine and outputting an air-conditioning-on signal corresponding thereto;
 (e) a power steering apparatus switch for detecting that a power steering apparatus is driven by the engine and outputting a power-steering-on signal corresponding thereto; and
 (f) a microcomputer for storing a usual-operation advance angle table prepared with engine speed and engine load as parameters and an idle-operation advance angle table prepared with engine speed as parameter, said microcomputer determining an appropriate usual-operation advance angle in response to the detected engine speed signal and the detected engine load signal and in accordance with table look-up method to the stored usual-operation advance angle table when said throttle sensor outputs no engine idle signal and an appropriate idle-operation advance angle in response to be detected engine speed signal and in accordance with table look-up method to the stored idle-operation advance angle table when said throttle sensor outputs an engine idle signal, said microcomputer correcting the determined idle-operation advance angle by retarding a predetermined value from the determined idle-operation advance angle when said throttle sensor outputs an engine idle signal and further when at least one of said air conditioning apparatus switch and said power steering apparatus switch outputs an respective apparatus-on signal.

6. The ignition timing control system as set forth in claim 4, wherein said microcomputer further determines a first value to be retarded from the determined idle-operation advance angle according to magnitude of air conditioning apparatus load and a second value to be retarded from the determined idle-operation advance angle according to magnitude of power steering apparatus load, and correcting the determined idle-operation advance angle by retarding at least one of the first and the second retarded value from the determined idle-operation advance angle, when said throttle sensor outputs an engine idle signal and further when at least one of said air conditioning apparatus switch and said power steering apparatus switch outputs an apparatus-on signal, an addition of said first and second values to be retarded from the determined idle-operation advance angle being limited to predetermined values under consideration of engine speed.

7. A method of controlling ignition timing for an internal combustion engine, which comprises the following steps of:
 (a) detecting engine speed N;
 (b) detecting an amount Q of intake air;
 (c) calculates a basic amount $T_p$ of fuel to be supplied to the engine;
 (d) checking whether or not a throttle valve is almost fully closed;
 (e) if the throttle valve is not almost fully closed, setting a usual-operation advance angle AdU in accordance with table look up method on the basis of the detected engine speed and the calculated basic fuel amount and a usual-operation advance angle table;
 (f) if the throttle valve is almost fully closed, checking whether or not at least one accessory is driven by the engine;
 (g) if at least one accessory is driven by the engine, setting a usual-operation advance angle AdU in the same manner as in step (e) above;
 (h) if no accessory is driven by the engine, setting an idle-operation advance angle AdIo in accordance with table look up method on the basis of the detected engine speed and an idle-operation advance angle table; and
 (i) outputting the set advance angle AdU or AdIo, respectively.

8. A method of controlling ignition timing for an internal combustion engine, which comprises the following steps of:
 (a) detecting engine speed N;
 (b) detecting an amount Q of intake air;
 (c) calculates a basic amount $T_p$ of fuel to be supplied to the engine;
 (d) checking whether or not a throttle valve is almost fully closed;
 (e) if the throttle valve is not almost fully closed, setting a usual-operation advance angle AdU in accordance with table look up method on the basis of the detected engine speed and the calculated basic fuel amount and a usual-operation advance angle table;
 (f) if the throttle valve is almost fully closed, setting an idle-operation advance angle AdIo in accordance with table look up method on the basis of the detected engine speed and an idle-operation advance angle table;
 (g) checking whether or not at least one accessory is driven by the engine;
 (h) if no accessory is driven by the engine, outputting the idle-operation advance angle AdIo set in step (f) above;
 (i) if at least one accessory is driven by the engine, determining a value Ret to be retarded;
 (j) correcting the idle-operation advance angle AdIo set in step (f) above by subtracting the retarded value Ret determined in step (i) above from the set advance angle AdIo; and
 (k) outputting the idle-operation advance angle (Ad=AdIo−Ret) corrected in step (j) above.

9. The method of controlling ignition timing as set forth in claim 7, wherein the step of determining a value to be retarded in step (i) of claim 7 comprises the following steps of:
 (a) checking whether or not an air conditioning apparatus is driven by the engine;
 (b) if driven, setting a first value to be retarded to (Ret 1=1);
 (c) if not driven, setting the first value to be retarded to (Ret 1=0);
 (d) checking whether or not a power steering apparatus is driven by the engine;
 (e) if driven, setting a second value to be retarded to (Ret 2=1);
 (f) if not driven, setting the second value to be retarded to (Ret 2=0);
 (g) adding the first and second values to be retarded;
 (h) checking whether or not the added value is zero;
 (i) if zero, setting the value to be retarded to zero; and
 (j) if not zero, setting the value to be retarded to a fixed value α.

10. The method of controlling ignition timing as set forth in claim 7, wherein the step of determining a value to be retarded in step (i) of claim 7 comprises the following steps of:
 (a) checking whether or not an air conditioning apparatus is driven by the engine;
 (b) if driven, setting a first value to be retarded according to air conditioning apparatus load to (Ret 1=1);
 (c) if not driven, setting the first value to (Ret 1=0);
 (d) checking whether or not a power steering apparatus is driven by the engine;
 (e) if driven, setting a second value to be retarded according to power steering apparatus load to (Ret 2=1);
 (f) if not driven, setting the second value to be retarded to (Ret 2=0);
 (g) adding the first and second values to be retarded;
 (h) checking whether or not the added value Ret exceeds a predetermined maximum value (Max Ret);
 (i) if the added value exceeds the maximum value, determining the maximum value; and
 (j) if the added value does not exceed the maximum value, determining the added value.

* * * * *